(12) United States Patent
Nagasaka et al.

(10) Patent No.: US 6,529,825 B2
(45) Date of Patent: Mar. 4, 2003

(54) VOICE GUIDANCE SWITCHING DEVICE AND METHOD

(75) Inventors: Chikao Nagasaka, Aichi-ken (JP);
Yoshimasa Kunimatsu, Aichi-ken (JP);
Masato Nishikawa, Aichi-ken (JP);
Susumu Mega, Aichi-ken (JP)

(73) Assignee: Kabushiki Kaisha Tokai-Rika-Denki Seisakusho, Aichi (JP)

( * ) Notice: Subject to any disclaimer, the term of this patent is extended or adjusted under 35 U.S.C. 154(b) by 0 days.

(21) Appl. No.: 09/962,793

(22) Filed: Sep. 26, 2001

(65) Prior Publication Data

US 2002/0040272 A1 Apr. 4, 2002

(30) Foreign Application Priority Data

Oct. 3, 2000 (JP) .......................................... 2000-303998

(51) Int. Cl.$^7$ ............................................. G01G 21/28
(52) U.S. Cl. ........................ 701/211; 348/148; 340/692; 340/988; 455/158.4; 455/186.2; 180/168
(58) Field of Search ................................. 707/211, 209, 707/201, 210, 1, 36, 23, 28, 202, 79, 74; 345/764; 348/148, 135; 340/988, 990, 995, 996, 692, 5.62; 455/517, 414, 507, 158.4, 186.1, 186.2, 90, 128, 345; 180/167, 168, 271

(56) References Cited

U.S. PATENT DOCUMENTS

| | | | | |
|---|---|---|---|---|
| 5,086,510 A | * | 2/1992 | Guenther et al. | ............ 455/128 |
| 5,239,700 A | * | 8/1993 | Guenther et al. | ......... 455/158.4 |
| 5,555,502 A | * | 9/1996 | Opel | ............................ 701/36 |
| 5,635,925 A | * | 6/1997 | Kishi et al. | .................. 340/660 |
| 5,935,193 A | * | 8/1999 | Saiki | ........................... 340/990 |
| 6,128,571 A | * | 10/2000 | Ito et al. | ...................... 340/995 |
| 6,275,231 B1 | * | 8/2001 | Obradovich | ................ 345/970 |
| 6,349,616 B1 | * | 2/2002 | Onodera et al. | ......... 200/61.54 |

\* cited by examiner

*Primary Examiner*—Thomas G. Black
*Assistant Examiner*—Ronnie Mancho
(74) *Attorney, Agent, or Firm*—Nixon Peabody LLP; Thomas W. Cole

(57) ABSTRACT

A voice guidance switching device for use in a car navigation device. When a navigation control section receives a signal from one of a controller and a controller, the navigation control section determines whether the signal is a first signal or a second signal. When the signal is determined to be the first signal, the navigation control section reads a voice guidance switching program from a storage medium and determines whether the signal has been transmitted from the controller or from the controller. The navigation control section also determines whether or not the vehicle is travelling at the time on the basis of a signal from a speed sensor, and then switches a voice guidance generating program between an operable state and an inoperable state on the basis of these determination results.

18 Claims, 10 Drawing Sheets

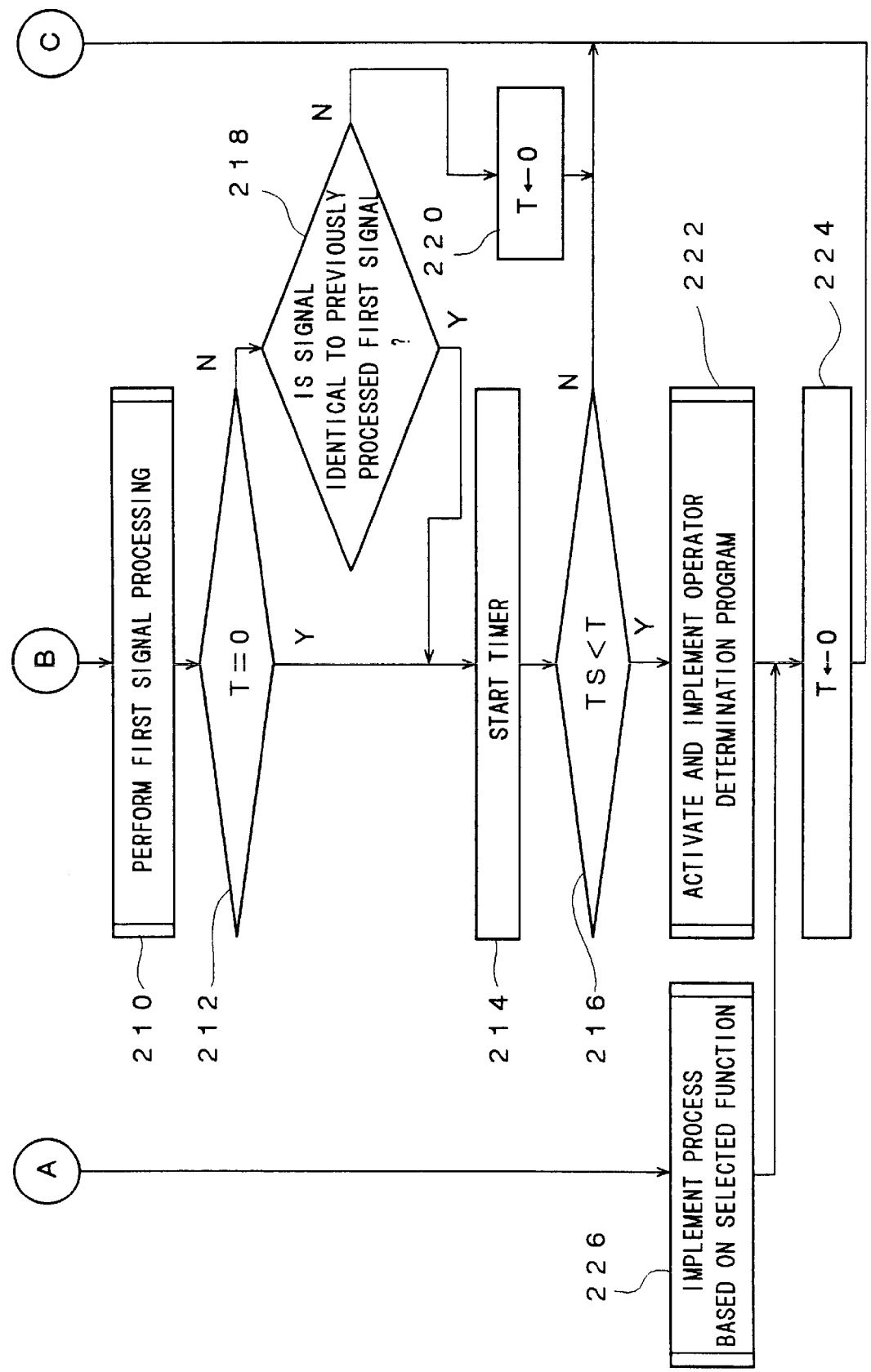

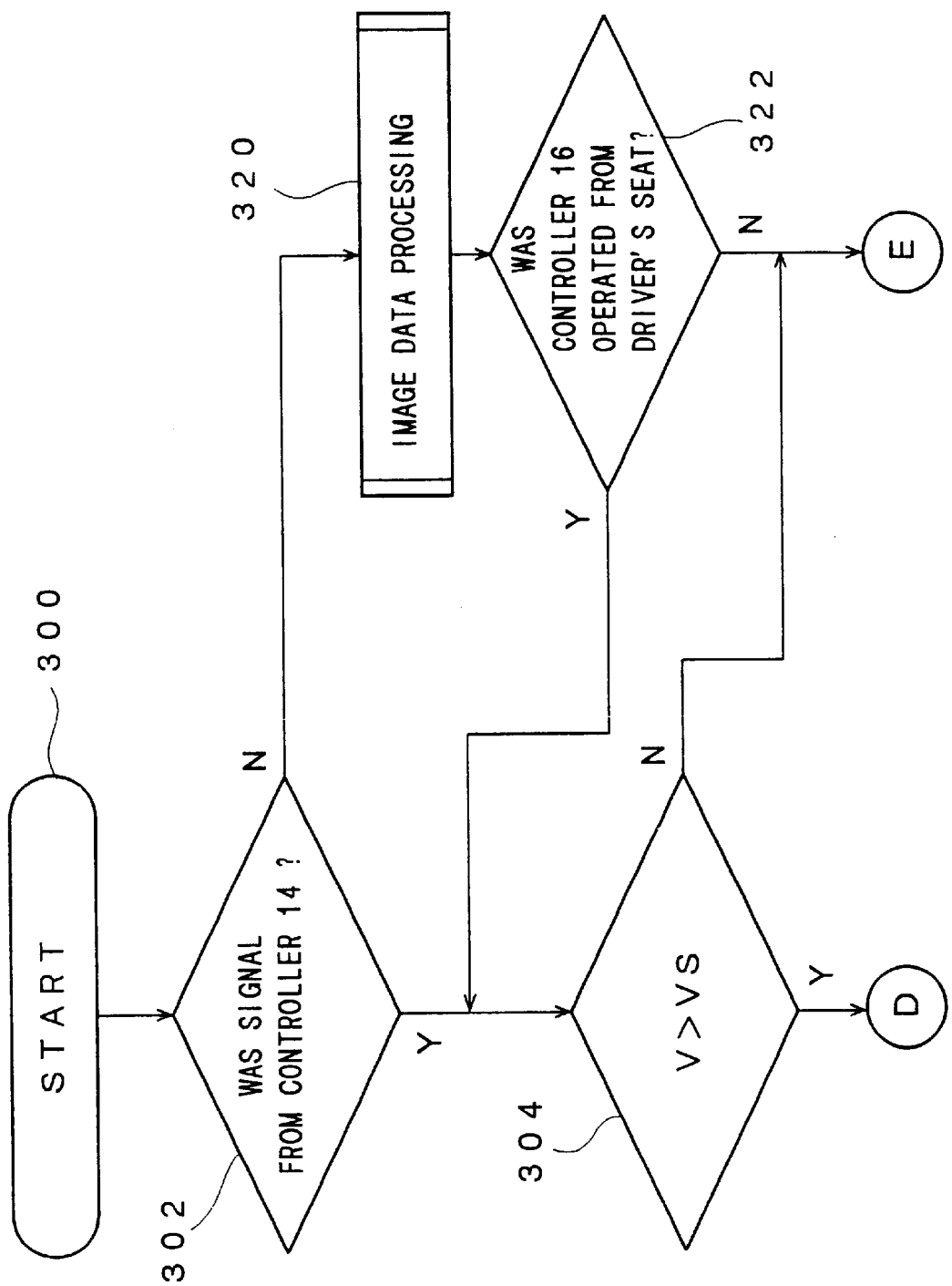

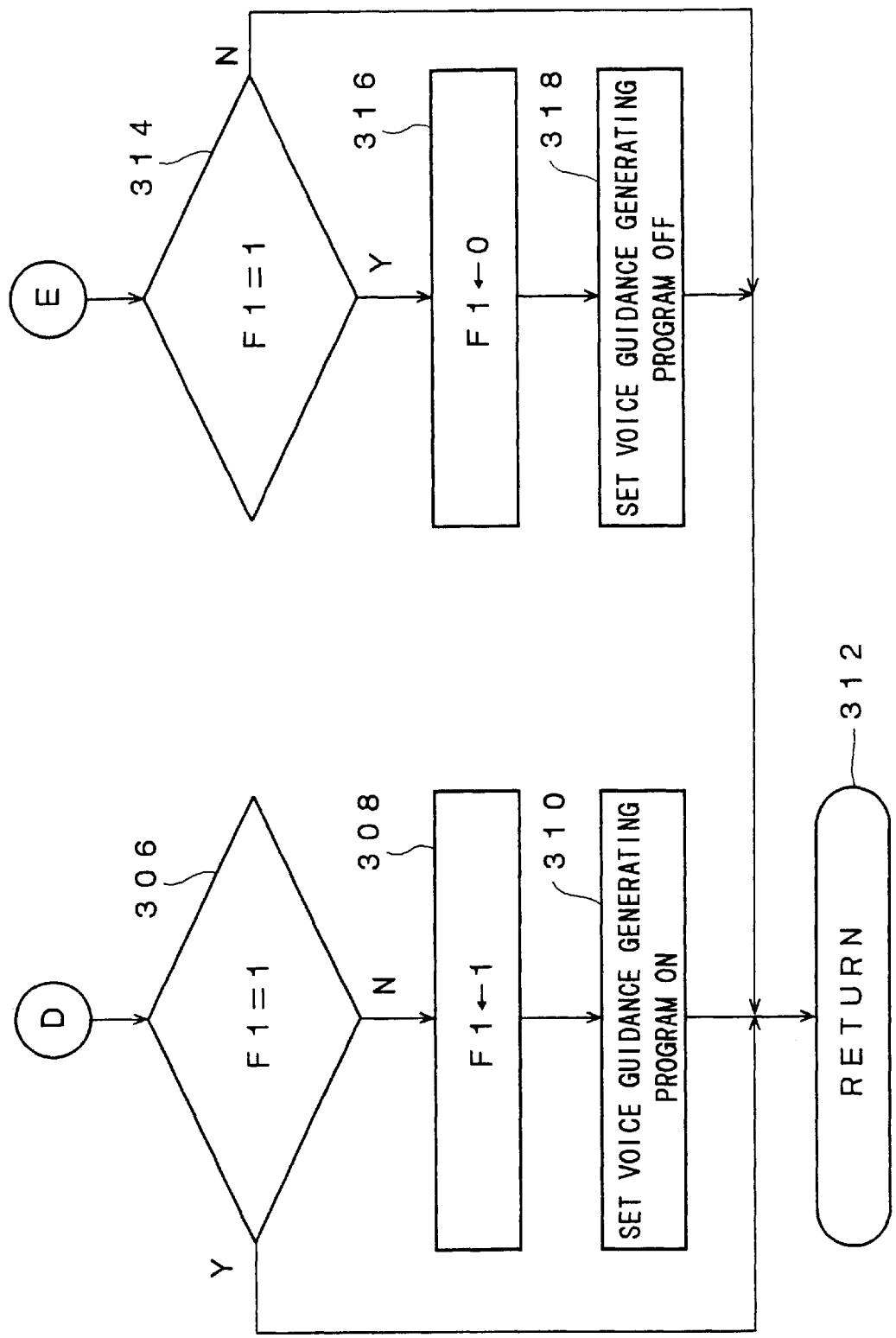

VOICE GUIDANCE SWITCHING DEVICE AND METHOD

BACKGROUND OF THE INVENTION

1. Field of the Invention

The present invention relates to a voice guidance switching device for use in, for example, a car navigation device installed in a vehicle.

2. Description of the Related Art

In recent years, various functions have been added to car navigation devices installed in vehicles. For this reason, when function-selecting and function-confirming switches are provided for each function, the number of switches increases. In consideration of this drawback, car navigation devices are generally disposed with a monitor having a screen on which are displayed virtual buttons that indicate various functions. The virtual buttons are selected and confirmed by use of touch sensors disposed in the monitor or by use or a controller including a joystick, whereby the functions represented by the virtual buttons are implemented.

When the car navigation device is structured in this manner, it becomes possible to display many virtual buttons simply by switching the monitor screen, whereby the number of actual switches is reduced. In other words, there is an advantage in that many functions can be added to the car navigation device itself, regardless of whether the device utilizes a controller having a few number of switches, panel switches, or a controller using a means including a joystick that have a few number of switches.

However, every time the monitor screen is switched, the virtual buttons displayed on the monitor screen are altered. For this reason, there is a disadvantage in that the screen must be viewed when the navigation device is operated, which means that a driver cannot safely operate the navigation device while driving the vehicle.

In order to overcome this disadvantage, proposals have been made to add a voice guidance function to car navigation devices, whereby the name and description of a function to be implemented by confirming the virtual button that has been selected is outputted by voice, in cases in which a virtual button has been selected by a controller or by touching touch sensors in the monitor screen and cases in which a virtual button is selected by moving a joystick.

When such a voice guidance function is added to the car navigation device, it becomes unnecessary to view the monitor screen since the description of the function to be implemented can be understood by listening to the outputted voice. This proves advantageous because it is possible for a driver to select a virtual button for implementing a desired function without having to take his/her eyes off of the road to view the monitor.

In such a car navigation device disposed with a voice guidance function, the voice guidance is generated once a virtual button is selected. After the voice guidance has been completed, the voice guidance function is confirmed. Thus, time is consumed because a plurality of selections must be hierarchically made until the desired function is finally implemented.

Consequently, except for the time when the driver operates the car navigation device while the vehicle is in motion, the voice guidance is unnecessary because the car navigation device can be operated while viewing the monitor screen when a vehicular occupant other than the driver operates the car navigation device or when the driver operates the car navigation device while the vehicle is stopped. However, when it becomes necessary to use voice guidance to operate the car navigation device, it is troublesome for the operator (driver or passenger) because time is consumed until a desired function is finally implemented.

SUMMARY OF THE INVENTION

In view of the aforementioned facts, it is an object of the present invention to obtain a voice guidance switching device that can switch voice guidance between an operable state and an inoperable state, in response to situations in which the voice guidance is or is not necessary.

A voice guidance switching device of the present invention, comprises: a voice guidance generator for generating a voice in response to a function of a specific device in a vehicle interior, with the voice guidance generator being connected to the specific device; a first operating device for operating the specific device by predetermined operations, with the first operating device being disposed at a location at which the first operating device can be operated by an occupant seated in a driver's seat of the vehicle; a second operating device for operating the specific device by operations corresponding to the predetermined operations, with the second operating device being disposed at a location at which an occupant seated in a seat other than the driver's seat can operate the second operating device; and a switching device, wherein the switching device receives a signal transmitted from one of the first operating device and the second operating device, determines whether the signal is transmitted from the first operating device or the second operating device, and switches the voice guidance generator to an operable state when it is determined that the signal is transmitted from the first operating device.

In accordance with the voice guidance switching device with the above-described structure, a variety of signals such as operation signals transmitted from the first operating device and the second operating device are transmitted to the switching device. At the switching device, a determination is made of whether the received signal is transmitted from the first operating device or from the second operating device.

Here, if it is determined that the signal received at the switching device is from the first operating device, the voice guidance generator is set to the operable state by the switching device.

For example, in a case in which the voice guidance generator is connected to a car navigation device, when a virtual button which is for a function selection and displayed on a monitor screen is selected, the voice guidance generator utters a function name, function content or the like of the selected virtual button. Otherwise, in a case in which a vehicle reached a place where the vehicle is required to turn right or left, the voice guidance generator suggests by voice, for example, to turn right or left.

Meanwhile, for example, if the voice guidance generator is set to a stopped state (an inoperable state) by the switching device in a case in which it is determined that the signal received at the switching device is from the second operating device, the voice guidance generator basically never operates in any conditions. Therefore, for example, in a case in which the virtual button displayed on the monitor screen is selected with the above-described car navigation device, the voice guidance generator never utter by voice the function content and the function name, or it never suggests by voice, for example, to turn right or left.

Preferably, the voice guidance switching device of the present invention further comprising: a determination device for determining whether the second operating device has been operated from the driver's seat or a seat other than the driver's seat, with the determination device being disposed in correspondence with the second operating device, wherein the second operating device is disposed at a location at which the second operating device can be operated from the driver's seat and a seat other than the driver's seat.

In accordance with the voice guidance switching device with the above-described structure, the second operating device is operable from both the driver's seat side and the seat other than the driver's seat. However, in a case in which the second operating device was operated, a determination is made by the determination device of whether the second operating device was operated from the driver's seat side or from the seat other than the driver's seat. A signal corresponding to the determination result of the determination device is transmitted to the switching device. If the determination device determined that the second operating device was operated from the driver's seat side, the switching device sets the voice guidance generator to the operable state. Accordingly, the voices corresponding to the operation content are uttered.

On the other hand, if the determination device determined that the second operating device was operated from the seat other than the driver's seat, the switching device sets the voice guidance generator to the stopped (inoperable) state. The voice guidance generator thus never be operated basically in any conditions.

More preferably, the voice guidance switching device of the present invention further comprising a speed detector for detecting vehicle speed and generating a speed signal corresponding to the vehicle speed, wherein the speed detector is one of directly and indirectly connected to the switching device, and the switching device switches the voice guidance generator between the operable state and the inoperable state on the basis of the speed signal.

At the voice guidance switching device with the above-described structure, the speed of the vehicle when the vehicle is travelling is detected by the speed detector. Further, this speed detector is connected to the switching device and transmits the speed signal corresponding to the vehicle speed which was detected by the speed detector itself. At the switching device, a determination is made, from the speed signal transmitted from the speed detector, of a travelling state of the vehicle, i.e., whether or not a current travelling speed of the vehicle is exceeding a predetermined speed, whether or not the vehicle is stopping, or the like.

Further, on the basis of this determination result (in other words, on the basis of the speed signal transmitted from the speed detector), for example, even if the first operating device was operated, in a case in which the travelling speed of the vehicle is lower than the predetermined speed and in a case in which the vehicle is stopping, the switching device sets the voice guidance generator to the operation stopped state.

Further preferably, the voice guidance switching device of the present invention wherein the switching device switches the voice guidance generator between the operable state and the inoperable state on the basis of whether duration of an operation performed at one of the first operating device and the second operating device is equal to or exceeds a predetermined amount of time.

In accordance with the voice guidance switching device with the above-described structure, when the first operating device or the second operating device is operated, the switching device sets the voice guidance generator to the operable state or the stopped (inoperable) state basically on the basis of the signal transmitted as the first operating device or the second operating device was operated. However, if the first operating signal or the second operating signal has not continuously been operated for or passing a predetermined duration, the switching device does not switch the voice guidance generator from the operable state to the stopped state, or from the stopped state to the operable state.

Accordingly, the voice guidance generator can be prevented from being switched in association with an inadvertent operation.

Still further preferably, the voice guidance switching device of the present invention wherein the voice guidance generator generates a voice for a function, among a plurality of functions of the specific device, selected by operation of one of the first operating device and the second operating device.

In accordance with the voice guidance switching device with the above-described structure, one of the plurality of functions owned by the specific device is selected by the first operating device or the second operating device. If the voice guidance generator is in the operable state at this selected state, the voice guidance generator utters voices for the selected function such as the name and the outline of the function.

Therefore, when an occupant seated at the driver's seat operates the first operating device when the vehicle is travelling, the occupant can confirm the selected function without viewing the first operating device and the display section which displays the plurality of functions that the above-described specific device own.

On the other hand, in a state in which an operator of the first operating device or the second operating device can view the first operating device or the second operating device and the display section or the like that are owned by the above-described specific device, i.e., in a state in which a guidance given by voice is not particularly needed, such as in a case in which an occupant seated at the seat other than the driver's seat operates the second operating device, if the voice guidance generator is set to the operation stopped state by the switching device, subsequent operations will be allowed without waiting for the voices.

More preferably, the voice guidance switching device of the present invention wherein the specific device comprises a monitor having a screen, with the monitor outputting predetermined images on the screen; and a controller for outputting to the monitor screen one to a plurality of selections and selecting one to a plurality of the selections on the basis of a signal transmitted from one of the first operating device and the second operating device; wherein the voice guidance generator generates a voice for the selection selected on the basis of the signal transmitted from one of the first operating device and the second operating device.

In accordance with the voice guidance switching device with the above-described structure, when the first operating device or the second operating device is operated in a state in which the controlling section displays a selective section or the plurality of selective sections on a monitoring device, the selective section or one of the plurality of selective sections is selected. In this selected state, if the voice guidance generator is in the operable state, the voice guidance generator utters voices (e.g., the name and the outline of the function) for the selected function.

Accordingly, when the occupant seated at the driver's seat operates the first operating device while the vehicle is travelling, the occupant seated at the driver's seat can confirm which selective section (function) was selected without viewing the screen of the monitoring device.

On the other hand, in a state in which an operator can view the screen of the monitoring device, i.e., a state in which the guidance given by voice is not particularly needed, such as in a case in which the occupant seated at the seat other than the driver's seat operates the second operating device, the voice guidance generator is set to the operation stopped state by the determination device and the switching device, subsequent operations or the like are thus allowed without waiting for the voices.

Incidentally, as described above, in the invention relating to the respective claims, the specific device, the voice guidance generator, and the switching device are basically connected to each other. In the structure of the voice guidance switching device of the present invention, each of the specific device and other devices which form the voice guidance switching device may be provided independently to each other, and two or more among them may be integrated to be substantially formed to as one device.

Specifically, the switching device, the determination device and the like may be comprised by a computer or a CPU.

Further, the present invention itself can be a function of a specific device. In this case as well, it is considered that the specific device and the structure of the present invention are connected to each other.

Specifically, in a case in which the present invention is applied to a car navigation device and an audio unit, the present invention and the car navigation device or the audio unit may be formed separately and mechanically and electrically connected to each other. In a case in which the present invention is applied as a function to such car navigation device and audio unit, each of the car navigation device and the audio unit serve as a specific device as well as the present invention itself.

BRIEF DESCRIPTION OF THE DRAWINGS

FIGS. 7A and 7B are schematic flow charts of a system of the voice guidance switching device relating to the embodiment of the present invention.

FIGS. 8A and 8B are schematic flow charts of a voice guidance switching program of the voice guidance switching device relating to the embodiment of the present invention.

DESCRIPTION OF THE PREFERRED EMBODIMENT

Figure 1:
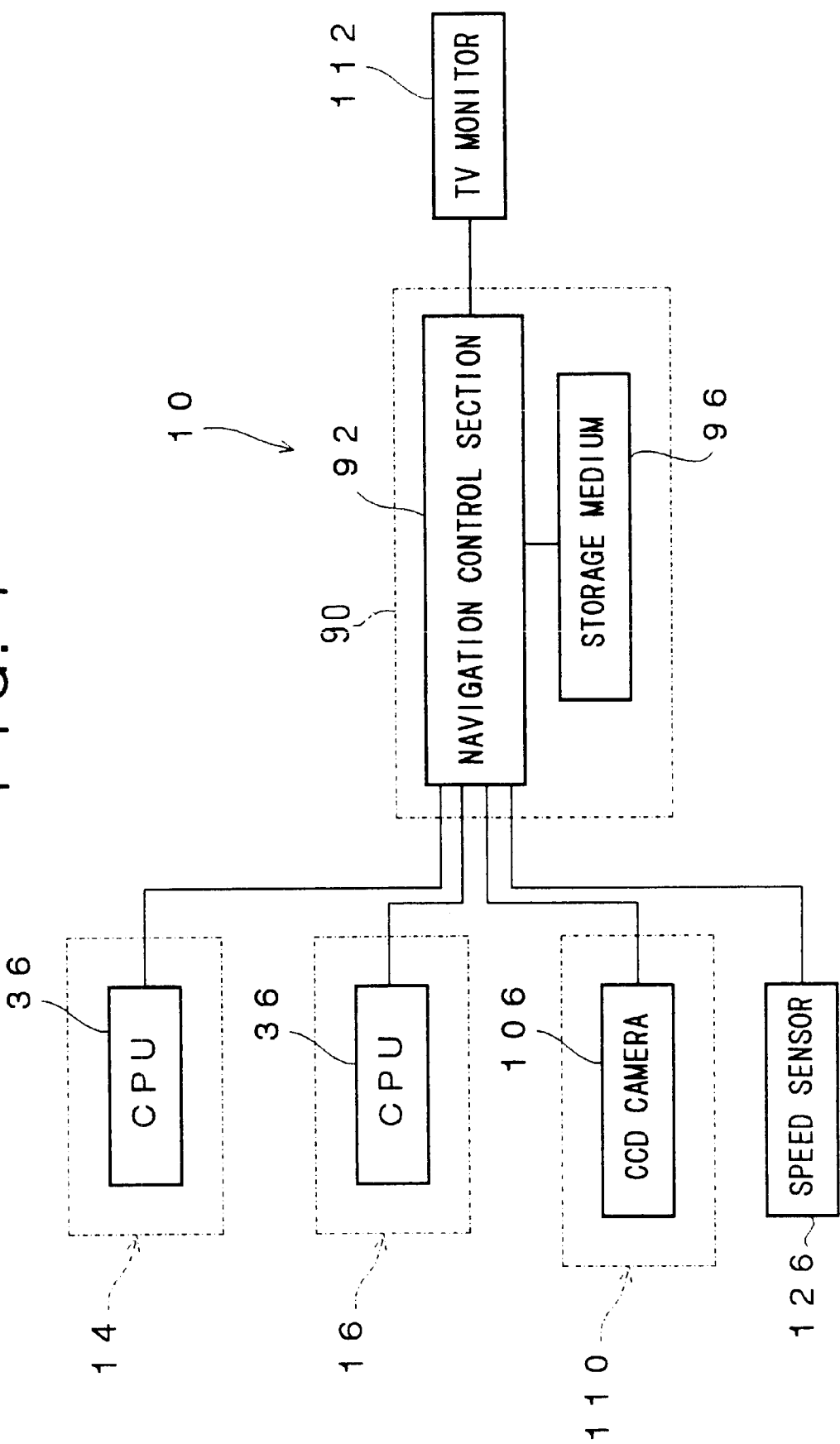
FIG. 1 is a block diagram which illustrates a schematic structure of a car navigation device to which a voice guidance switching device relating to an embodiment of the present invention is applied.
Figure 2:
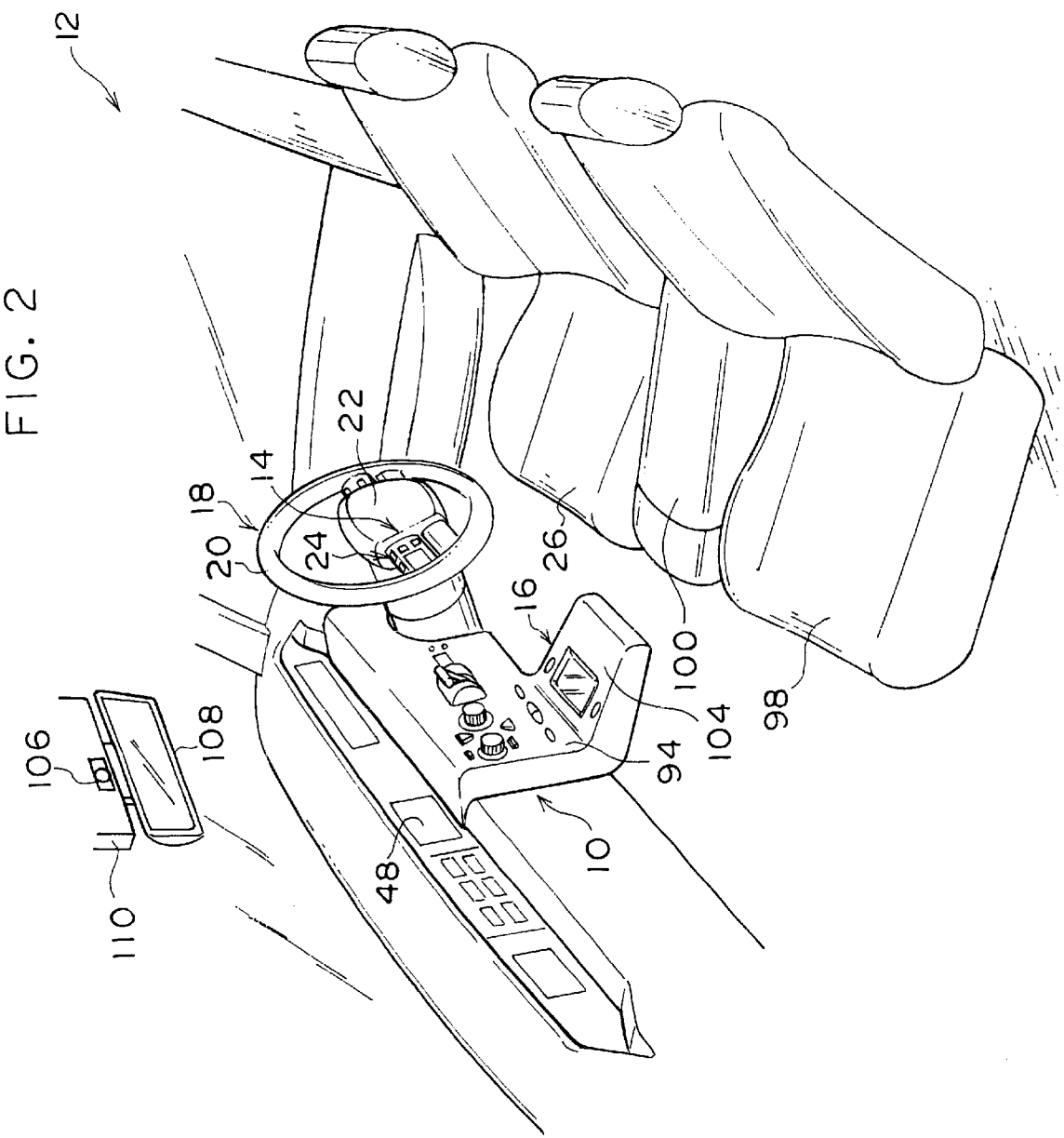
FIG. 2 is a perspective view which illustrates an interior of a vehicle into which the car navigation device, having the voice guidance switching device relating to the embodiment of the present invention, is installed.
Figure 3:
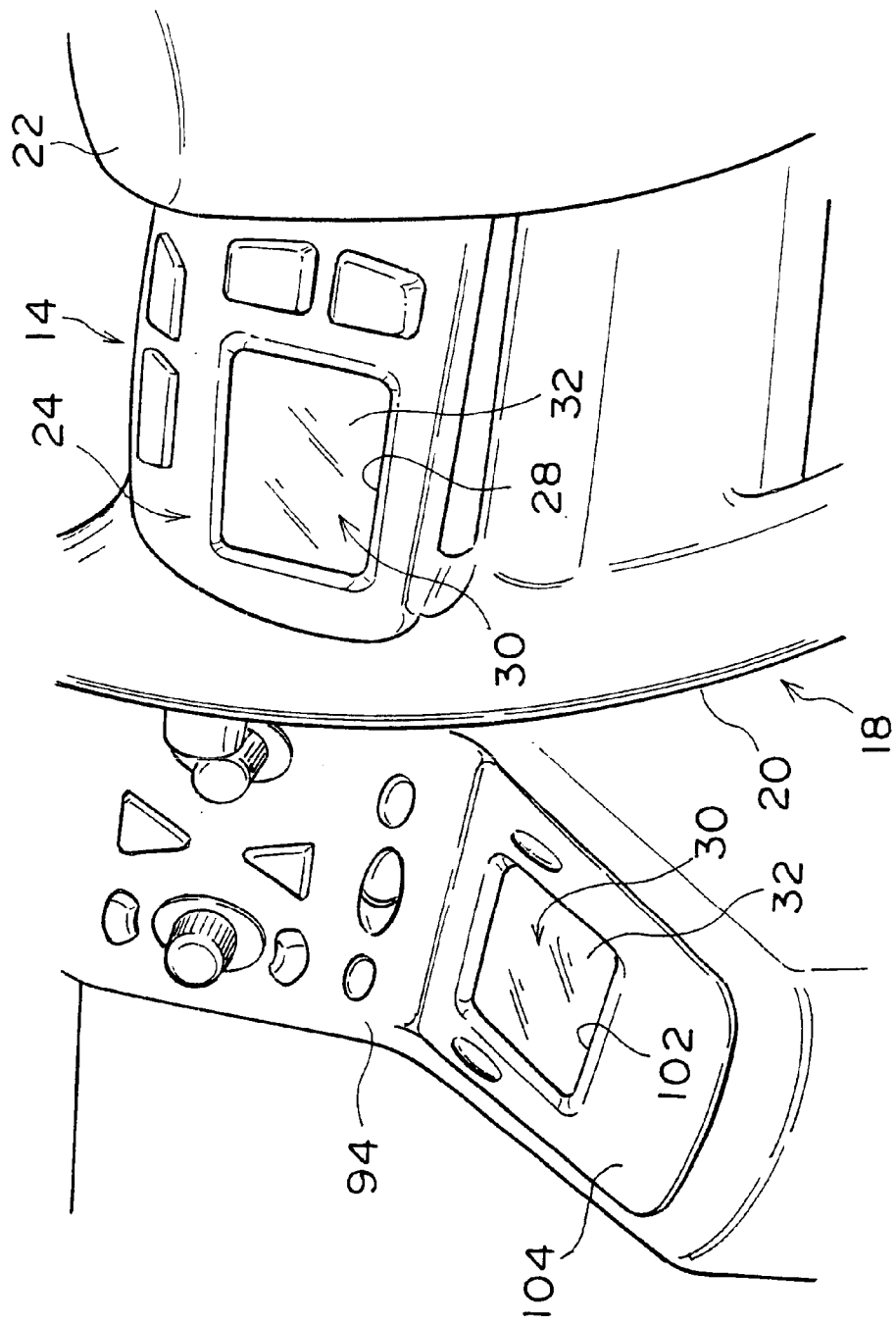
FIG. 3 is a perspective view which illustrates essential parts of the interior of the vehicle.

In FIG. 1, a schematic structure of a car navigation device 10 that serves as a specific device and includes a voice guidance switching device relating to an embodiment of the present invention as a function of the car navigation device is illustrated by a block diagram. In FIGS. 2 and 3, an interior of a vehicle 12, into which the car navigation device 10 is installed, is illustrated by perspective views.

As illustrated in FIGS. 2 and 3, the car navigation device 10 includes a controller 14 that is operable by an occupant seated in a driver's seat (hereinafter, "the controller 14") and a controller 16 that is operable by an occupant seated in a passenger's seat (hereinafter, "the controller 16"). The controller 14 serves as a first operating device and the controller 16 serves as a second operating device.

Figure 4:
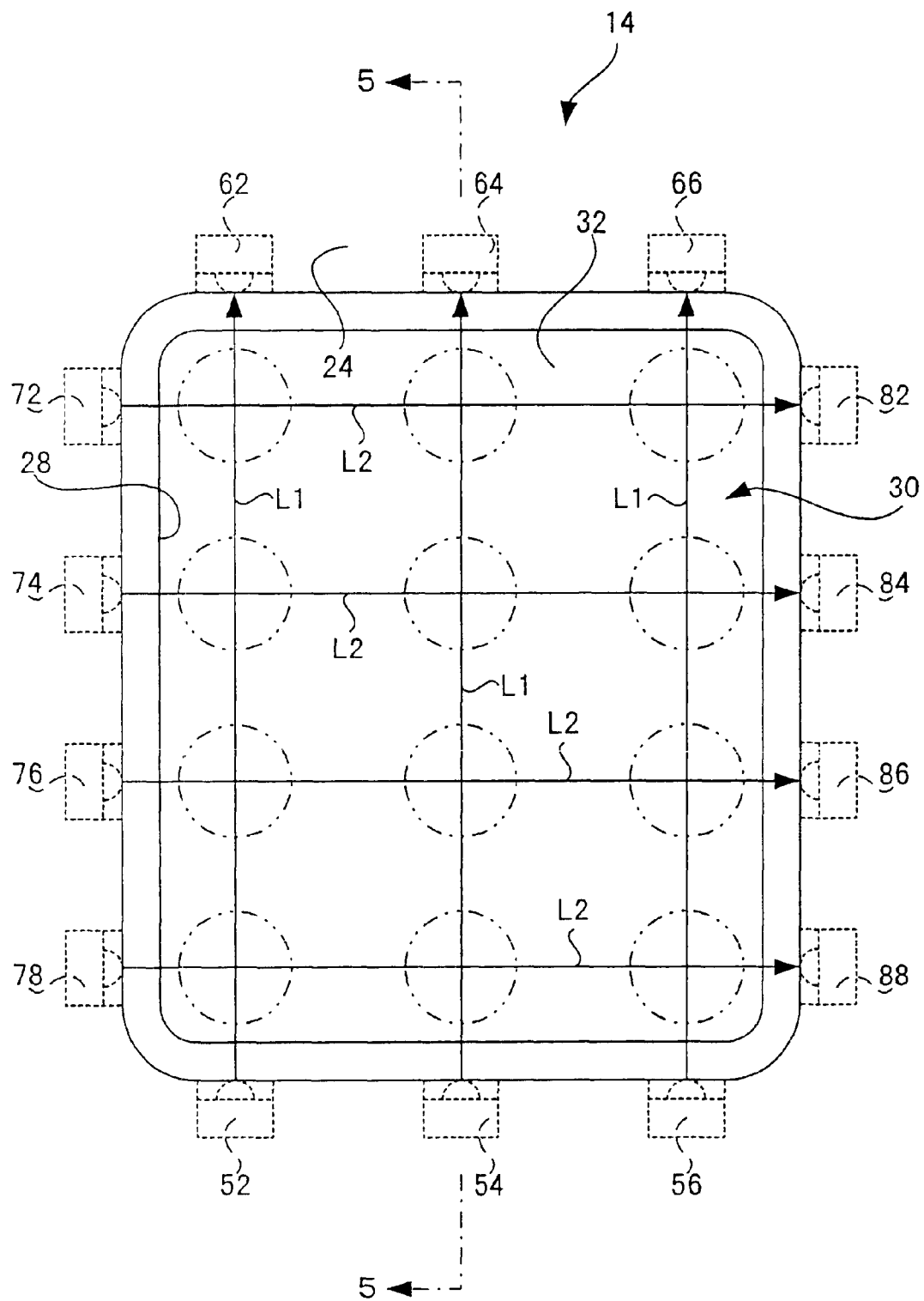
FIG. 4 is a plan view which illustrates essential parts of a first operating device.
Figure 5:
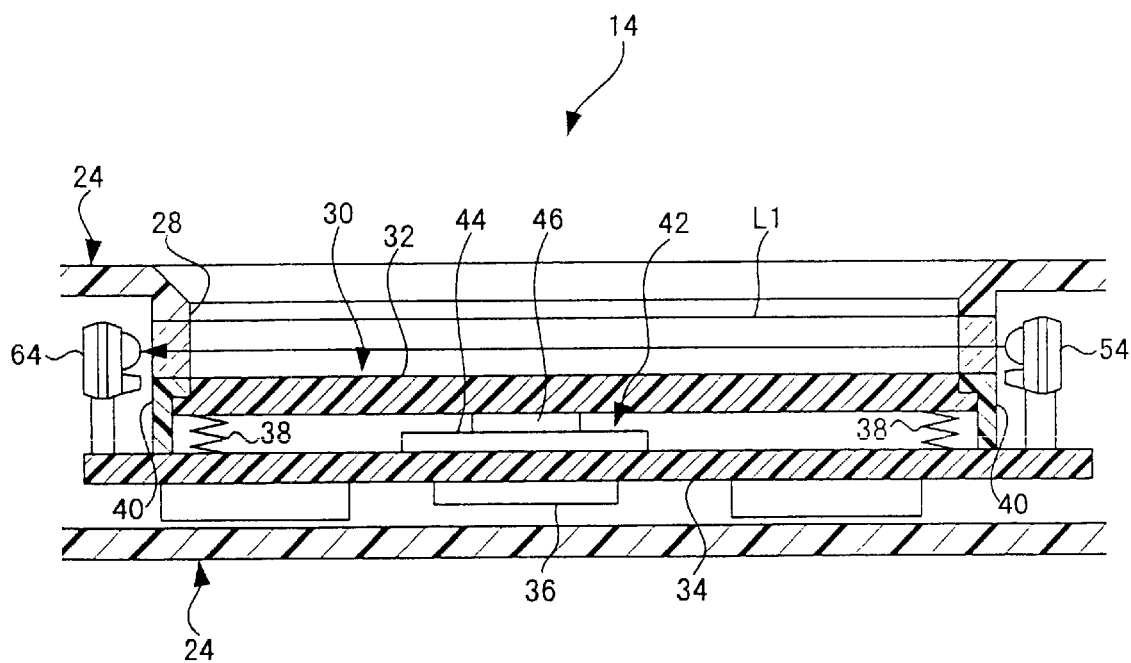
FIG. 5 is a sectional view, taken along line 5—5 in FIG. 4, that illustrates the essential parts of the first operating device.

The controller 14 includes a controller main body 24 that is disposed between a rim 20 of a steering wheel 18 and a steering pad 22. Further, the controller main body 24 is integrally disposed with the steering wheel 18. As illustrated in FIG. 3, a substantially rectangular opening 28 that opens substantially toward an occupant seated in a driver's seat 26 is formed in the controller main body 24. As illustrated in FIGS. 4 and 5, a panel 32 that forms a panel switch 30 is disposed at the controller main body 24 in opposition to the opening 28. An outer peripheral configuration of the panel 32 is formed in a substantially rectangular plate-shape to correspond to an outer peripheral configuration of the opening 28.

Further, as illustrated in FIG. 5, a substrate 34 is disposed under the panel 32 substantially parallel to the panel 32. Wiring such as printed wiring is applied to at least one of a surface and a back surface of the substrate 34. Controllers, such as a CPU 36 for the controller 14, as well as electrical components such as a resistor and a capacitor, are electrically connected to the substrate 34 through the wiring. The substrate 34 is directly or indirectly fixed to the controller main body 24 by unillustrated retainers. Further, compression coil springs 38 are disposed on the substrate 34 and support the panel 32 in a manner such that the panel 32 is movable towards and away from the substrate 34 in a state in which the panel 32 is urged to the opening 28. Moreover, stoppers 40 are provided at the substrate 34. The stoppers 40 engage and hold the outer peripheral portion of the panel 32 so the panel 32 does not exceed a predetermined distance with respect to the substrate 34.

A push switch 42 that forms a panel switch 30 together with the panel 32 is provided between the panel 32 and the substrate 34. The push switch 42 includes a switch main body 44. The switch main body 44 has a fixed contact point (not illustrated). The fixed contact point is electrically connected to the wiring applied to the substrate 34. Moreover, a movable portion 46 is provided at the switch main body 44. The movable portion 46 is movable with respect to the switch main body 44 in a direction which is substantially the same as the direction in which the panel 32 moves towards and away from the substrate 34. By the panel 32 moving in a direction toward the substrate 34, at least part of the movable portion 46 moves into the switch main body 44. Further, the movable portion 46 has a movable contact point (not illustrated) which contacts and electrically connects with the fixed contact point of the switch main body 44 when the movable portion 46 moves in a direction towards the substrate 34. By the panel 32 moving apart from the substrate 34, the electrical connection between the movable contact point and the fixed contact point is severed.

A surface of the movable portion 46 opposite to a surface which abuts the switch main body 44 abuts the back surface of the panel 32. Accordingly, by the panel 32 moving in a direction towards the substrate 34 and counter to an urging force generated by the compression coil spring 38, the movable portion 46 approaches the substrate 34 and the movable contact point of the movable portion 46 contacts the fixed contact point of the switch main body 44.

As illustrated in FIG. 4, a plurality (three in the present embodiment) of light emitting diodes 52, 54, and 56 is disposed at a longitudinal direction end of the panel 32. The light emitting diodes 52, 54 and 56 are disposed at predetermined intervals along the one of the longitudinal direction ends of the panel 32. Light beams L1 emitted from the respective light emitting diodes 52, 54 and 56 pass above and parallel to an upper surface of the panel 32 and in parallel with each other.

As illustrated in FIG. 5, the light emitting diodes 52, 54 and 56 are connected to the substrate 34, and further electrically connected to the CPU 36 through the wiring provided at the substrate 34. The light beams L1 are emitted on the basis of electrical signals transmitted from the CPU 36.

Further, as illustrated in FIG. 4, a plurality (three in the present embodiment) of receiving elements 62, 64 and 66 is disposed at another longitudinal direction end of the panel 32 (i.e., the longitudinal direction end of the panel 32 opposite to the longitudinal direction end of the panel 32 disposed with the light emitting diodes 52, 54 and 56). The receiving elements 62, 64, and 66 are disposed to correspond to the light emitting diodes 52, 54 and 56, and respectively receive the light beams L1 emitted from the corresponding light emitting diodes 52, 54 and 56.

As illustrated in FIG. 5, the receiving elements 62, 64 and 66 are connected to the substrate 34, electrically connected to the CPU 36 through the wiring provided at the substrate 34, and transmit as electrical signals to the CPU 36 information concerning whether or not the receiving elements 62, 64 and 66 have received the light beams L1.

As illustrated in FIG. 4, a plurality (four in the present invention) of light emitting diodes 72, 74, 76 and 78 is disposed at a transverse direction end of the panel 32. The light emitting diodes 72, 74, 76 and 78 are disposed at predetermined intervals along the one of the transverse direction ends of the panel 32. Light beams L2 that are emitted from the respective light emitting diodes 72, 74, 76 and 78 pass above and parallel to an upper surface of the panel 32 and in parallel with each other.

The light emitting diodes 72, 74, 76 and 78 are connected to the substrate 34 and electrically connected to the CPU 36 through the wiring provided at the substrate 34. The light beams L2 are emitted on the basis of electrical signals transmitted from the CPU 36.

A plurality (four in the present embodiment) of receiving elements 82, 84, 86 and 88 is disposed at another transverse direction end of the panel 32 (i.e., the transverse direction end of the panel 32 opposite to the transverse direction end of the panel 32 disposed with the light emitting diodes 72, 74, 76 and 78). The receiving elements 82, 84, 86 and 88 are disposed to correspond to the light emitting diodes 72, 74, 76 and 78, and respectively receive the light beams L2 emitted from the corresponding light emitting diodes 72, 74, 76 and 78.

Moreover, the respective receiving elements 82, 84, 86 and 88 are connected to the substrate 34, electrically connected to the CPU 36 through the wiring provided at the substrate 34, and transmit to the CPU 36 as electrical signals information concerning whether or not the receiving elements 82, 84, 86 and 88 have received the light beams L2.

Further, as illustrated in FIG. 1, the substrate 34 that includes the CPU 36 is electrically connected to a navigation control section 92 which forms a device main body 90 and serves as a voice guidance generator, switching device, and a determination device. Processing results at the CPU 36 are transmitted to this navigation control section 92.

The device main body 90 is disposed, for example, at a back surface of a controller main body 94 that forms the controller 16 (described later) and is located below an instrument panel 48, as illustrated in FIG. 2. The navigation control section 92 that forms the device main body 90 is connected to a storage medium 96, which also forms the device main body 90. When a predetermined processing signal is inputted to the navigation control section 92, the navigation control section 92 reads from the storage medium 96 processing programs and data that correspond to the processing signal.

As illustrated in FIG. 1, the navigation control section 92 is also connected to the controller 16. The controller 16 comprises the controller main body 94 provided at a front side (i.e., toward the front of the vehicle) of a console box 100 that is disposed between the driver's seat 26 and a passenger's seat 98.

As illustrated in FIG. 3, the controller main body 94 includes an operating table 104 having a substantially rectangular opening 102 that opens substantially toward the top of the vehicle. The structure of the operating table 104 is basically the same as that of the controller main body 24 of the controller 14. Namely, at the operating table 104, the panel 32 is disposed to correspond to the opening 102, with the substrate 34, the light emitting diodes 52, 54, 56, 72, 74, 76 and 78, the receiving elements 62, 64, 66, 82, 84, 86 and 88 being similarly disposed. Detailed description of the operating table 104 will be omitted.

Further, as illustrated in FIG. 1, the navigation control section 92 comprises a CCD camera 106 that serves as an image pickup device and forms the determination device together with the navigation control section 92. As illustrated in FIG. 2, the CCD camera 106 is mounted to a camera unit 110 that is disposed above a rear-view mirror 108, and is capable of imaging (photographing) the operating table 104 from above. Image data that is imaged by the CCD camera 106 is transmitted to the navigation control section 92 to be processed.

Figure 6:
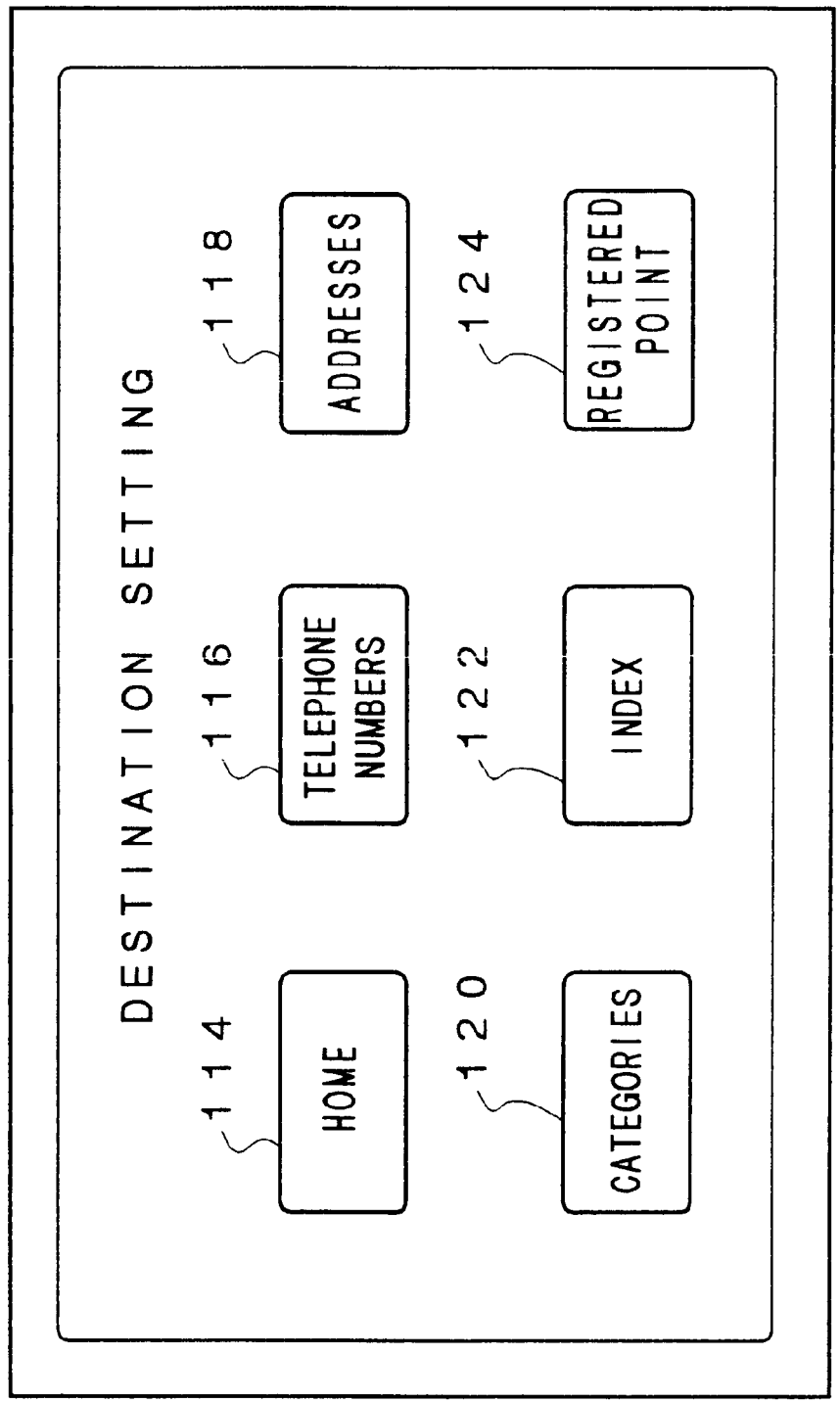
FIG. 6 is an example of a screen display of a monitor.

Moreover, as illustrated in FIG. 1, the car navigation device 10 includes a TV monitor 112 that serves as a monitor. The TV monitor 112 is included, in a state in which a screen thereof is substantially directed to a vehicle rear, in the instrument panel 48 disposed above the controller main body 94, so that occupants seated in the driver's seat 26 and in the passenger's seat 98 can view the screen. As illustrated in FIG. 1, the TV monitor 112 is connected to the navigation control section 92. On the basis of the processing programs and data that have been implemented and processed by the navigation control section 92, the navigation control section 92 displays various images such as a map (not illustrated) and function-selection screens, such as the example shown in FIG. 6 of a destination setting screen.

In the function-selection screen, a plurality of selection buttons are displayed. For example, in the function-selection screen illustrated in FIG. 6, selection buttons 114, 116, 118, 120, 122 and 124 serving as selections are displayed. By selecting one of the selection buttons 114–124, a function corresponding to that which is displayed in the selected button (e.g., letters, symbols, images, etc.) can be implemented.

Further, as illustrated in FIG. 1, the above-described navigation control section 92 is connected to a speed sensor 126 that is disposed at an appropriate position on the vehicle 12 and serves as a speed detector. Therefore, the navigation control section 92 can read the travelling speed of the vehicle 12 detected by the speed sensor 126.

Next, prior to describing overall operations and effects of the present embodiment, brief description will be given of the operation of the controller 14. Incidentally, since the controller 16 operates in a manner similar to the controller 14, description of the controller 16 will be omitted.

At the controller 14, the light beams L1 are emitted substantially parallel to the surface of the panel 32 from the respective light emitting diodes 52, 54 and 56, while the light beams L2 are emitted substantially parallel to the surface of the panel 32 and substantially orthogonal to the light beams L1 from the respective light emitting diodes 72, 74, 76 and 78. The light beams L1 and L2 emitted from the respective light emitting diodes 52–56 and 72–78 in a matrix form reach and are received by the respective receiving elements 62–66 and 82–88, as long as there is nothing to intercept the light beams L1 and L2.

When an operator touches the surface of the panel 32 with his or her finger (or fingers) in a state in which the light beams L1 and L2 are emitted from the respective light emitting diodes 52–56 and 72–78, the light beams L1 and L2 corresponding to the area of the panel 32 surface where the operator's finger has been placed are intercepted by the operator's finger. Therefore, the light beams L1 and L2 intercepted by the operator's finger do not reach the receiving elements 62–66 and 82–88 corresponding to the intercepted light beams L1 and L2. Further, the CPU 36 receives interception signals from the receiving elements 62–66 and 82–88 at which the light beams L1 and L2 have not been respectively received, and transmits a signal corresponding to the interception signals to the navigation control section 92.

Further, in the above-described state, as the panel 32 is pushed and displaced towards the substrate 34 counter to the urging force generated by the compression coil spring 38, the movable portion 46 of the push switch 42 is moved toward the substrate 34 side by pressure applied via the panel 32. Thus, the movable contact point of the movable portion 46 and the fixed contact point of the switch main body 44 make contact, whereby an electrical connection is established. Electrical connection between the movable contact point of the movable portion 46 and the fixed contact point of the switch main body 44 is detected by the CPU 36, which is electrically connected to the fixed contact point. When the CPU 36 detects the electrical connection between the movable contact point of the movable portion 46 and the fixed contact point of the switch main body 44, the CPU 36 transmits to the navigation control section 92 an electrical signal on the basis of a communication signal from the push switch 42.

Hereinafter, for sake of convenience, the electrical signal transmitted from the CPU 36 to the navigation control section 92 on the basis of the interception signals will be referred to as "the first signal", and the electrical signal transmitted from the CPU 36 to the navigation control section 92 on the basis of the communication signal will be referred to as "the second signal".

Next, operation and effects of the present embodiment will be described on the basis of flow charts illustrated in FIGS. 7A, 7B, 8A and 8B.

Figure 7A:
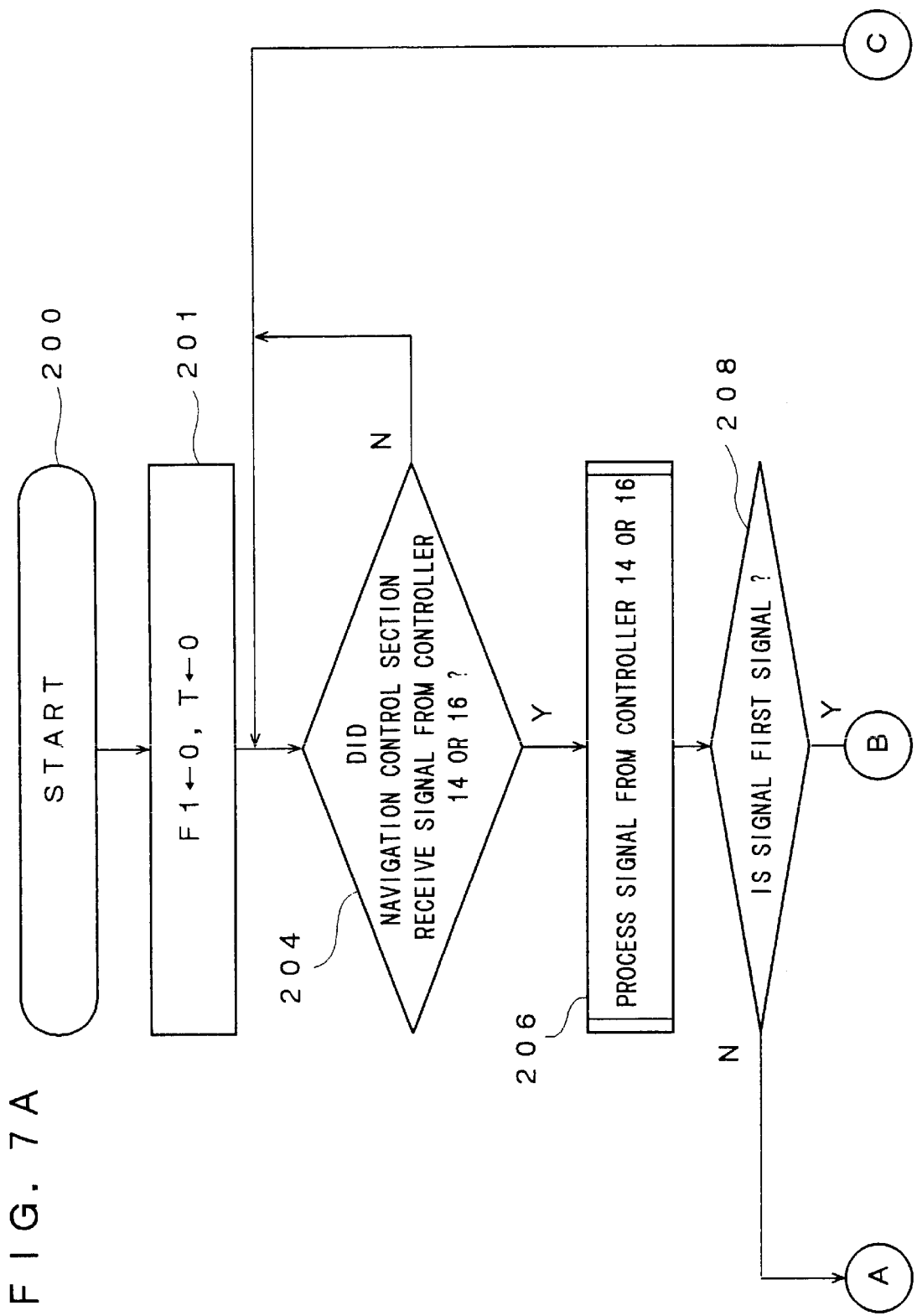

As illustrated in the flow chart in FIG. 7A, when a start switch (not illustrated) or the like of the car navigation device 10 is operated and the car navigation device 10 is actuated (step 200), flag F1 is reset to 0 and elapsed time T of a timer is reset to 0 (step 202).

Next, it is determined in step 204 whether or not the navigation control section 92 has received a signal (i.e., the first signal or the second signal) from the controller 14 or the controller 16. If the navigation control section 92 has not received a signal from the controller 14 or the controller 16, the routine returns to step 202.

On the other hand, if it is determined in step 204 that the navigation control section 92 has received a signal from the controller 14 or the controller 16, the received signal is processed in step 206. Next, in step 208, it is determined whether or not the signal processed in step 206 is the first signal. If it is determined that the processed signal is the first signal, the routine proceeds to step 210 and first signal processing is performed. In the first signal processing, color inversion or the like is effected with respect to the selection button (e.g., one selection button among the selection buttons 114–124 shown in FIG. 6) corresponding to one of the receiving elements 62, 64, or 66 and one of the receiving elements 82, 84, 86 or 88 that have not received the light beams L1 and L2.

In step 212, it is determined whether or not the elapsed time T of the timer is reset (i.e., whether or not elapsed time T is 0). If the elapsed time T is reset at this point, the timer is started in step 214.

Next, in step 216, it is determined whether or not the elapsed time T has exceeded a preset determination time TS. If the elapsed time T has not exceeded the determination time TS, the routine returns to step 204 and it is determined once again whether or not a signal from the controller 14 or the controller 16 has been received. If a signal from the controller 14 or the controller 16 has been received when the routine returns to step 204 from step 216, the routine proceeds to step 208 through step 206. If it is determined in step 208 that the signal is the first signal, the routine proceeds to step 214 through step 212. However, since the timer has already been started in this case, the elapsed time T is never 0. The routine therefore proceeds to step 218, where it is determined whether or not the processed signal is identical to the first signal that was previously processed.

In step 218, if it is determined that the first signal processed in step 210 is identical to the first signal that was previously processed, the routine proceeds to step 216 and it is determined once again whether or not the elapsed time T has exceeded the determination time TS. However, if it is determined that the first signal processed in step 210 is not identical to the first signal that was previously processed, the elapsed time T of the timer is reset in step 220, and the routine returns to step 204.

On the other hand, if, in step 216, it is determined that the elapsed time T has exceeded the determination time TS, the routine proceeds to step 222. In step 222, the navigation control section 92 reads a voice guidance switching program from the storage medium 96 and implements the program.

As illustrated in the flow chart in FIG. 8A, when the voice guidance switching program is implemented (step 300), it is determined in step 302 whether or not the first signal has been transmitted from the controller 14. If it is determined that the first signal has been transmitted from the controller 14, the routine proceeds to step 304. In step 304, detection result of the travelling speed of the vehicle 12 detected by the speed sensor 126 is read, and it is determined whether or not this detection result or the present speed V of the vehicle 12 has exceeded a predetermined determination speed VS. Incidentally, if it is to be determined whether or not the vehicle 12 is stopped, VS may be set to 0.

If it is determined, in step 304, that the vehicle 12 is travelling at a speed equal to or higher than the determination speed VS, it is determined in step 306 whether or not 1 has been assigned to flag F1, i.e., whether or not flag F1 is on. In this state, if flag F1 is not on, 1 is assigned to flag F1 to set flag F1 on in step 308, and the voice guidance generating program is actuated in step 310. Accordingly, the name of the function (e.g., the word appearing in the selection button representing the function selected) represented by the selection button (e.g., one selection button among the selection buttons 114–124 shown in FIG. 6) corresponding to one of the receiving elements 62, 64, or 66 and one of the receiving elements 82, 84, 86 or 88 that have not received the light beams L1 and L2 is audibly produced. Here, the voice guidance generating program is actuated when the travelling speed V of the vehicle 12 exceeds the determination speed VS so that the driver cannot safely view the screen of the TV monitor 112. In such a situation, the driver is informed by voice which of the selection buttons 114–124 the driver is selecting without having to view the screen of the TV monitor 112.

After voice guidance has been completed, the routine proceeds to step 224 in FIG. 7B through step 312. In step 224, the elapsed time T is reset, and the routine returns to step 204 once again.

On the other hand, if the travelling speed V of the vehicle 12 is lower than the determination speed VS in step 304, the voice guidance is basically unnecessary. Therefore, it is determined in step 314 whether or not 1 has been assigned to flag F1. If flag F1 is on in this state, 0 is assigned to flag F1 in step 316 to reset flag F1, the voice guidance generating program is stopped in step 318, and the routine proceeds to step 224 in FIG. 7B through step 312.

Namely, when flag F1 is on, the voice guidance generating program is actuated, and when flag F1 is reset, the voice guidance generating program is stopped.

Accordingly, for example, when the voice guidance generating program has already been actuated, there is no need to actuate the voice guidance generating program once again. Therefore, when the routine proceeds to step 306 in a state in which the voice guidance generating program has already been actuated, the routine directly proceeds to step 312 and to subsequent step 224 in FIG. 7B. Similarly, when the voice guidance generating program has already been stopped, there is no need to stop the voice guidance generating program. Therefore, when the routine proceeds to step 314 in a state in which the voice guidance generating program has already been stopped, the routine directly proceeds to step 312 and to subsequent step 224 in FIG. 7B.

When it is determined that, in step 302, the first signal is not transmitted from the controller 14, i.e., the first signal is from the controller 16, image data of the CCD camera 106 forming the camera unit 110 is read and processed in step 320, and, from the processed image data, it is determined in step 322 of whether or not the controller 16 was operated from the driver's seat 26.

If it is determined in step 322 that the controller 16 was operated from the driver's seat 26, the routine proceeds to step 304. Namely, even if the first signal is caused by operating the controller 16, if the controller 16 was operated by an occupant seated at the driver's seat 26, processing the same as that performed in the case in which the first signal transmitted from the controller 14 was received is performed. If it is determined that the controller 16 was not operated from the driver's seat 26, i.e., if it is determined that the controller 16 was operated from the passenger seat 98, the routine proceeds to step 314. In other words, if the controller 16 was operated from the passenger seat 98, the voice guidance is basically unnecessary so that processing the same as that performed when the travelling speed V of the vehicle 12 is lower than the determination speed VS is performed.

As described above, if the voice guidance generating program is stopped, voice guidance is not performed. Here, if the voice guidance generating program is stopped, this means that the travelling speed V of the vehicle 12 is lower than the determination speed VS or that an occupant seated in the passenger seat 98 operated the controller 16. Namely, if the voice guidance generating program is stopped, this means that the operator of the controller 14 or 16 can safely view the screen of the TV monitor 112. In such a situation, the operator may operate the controller 14 or the controller 16 while safely viewing the screen of the TV monitor 112, even though voice guidance is not given. Accordingly, if the operator can safely view the screen of the TV monitor 112 without the need for voice guidance, desired operations can be performed quickly and unnecessary voices are not generated.

As described above, after processing of the first signal is performed, if the second signal is transmitted from the controller 14 or the controller 16 to the navigation control section 92 by the panel 32 being pushed, as a result of the determination in step 208, the routine proceeds to step 226. In step 226, processing based on a function corresponding to the selection button 114–124 that has been selected is implemented.

Incidentally, in the embodiment described above, only the name and description of the function represented by the button selected of the selection buttons 114–124 are audibly generated by the voice guidance. However, the present invention may be applied, for example, to switch the voice guidance while processing (such as route guidance) based on a selected function is implemented in step 226.

Further, in the present embodiment, the panel switch 30 is applied to each of the controllers 14 and 16. However, the structure of the input device such as the controller is not limited to the same. For example, a controller that includes a plurality of buttons and allows a desired function to be selected and implemented by one of the buttons being pushed may also be employed. Alternatively, a socalled joystick type controller that selects a selection button (e.g., one selection button of the selection buttons 114–124) for a desired function by rotating and tilting a stick around a base end may also be employed.

As described above, in the present invention, the voice guidance can be automatically switched between the operable state and the inoperable state in response a case in which the voice guidance is necessary and a case in which the voice guidance is unnecessary.

What is claimed is:

1. A voice guidance switching device comprising:
    a voice guidance generator for generating a voice in response to a function of a specific device in a vehicle interior, with the voice guidance generator being connected to the specific device;
    a first operating device for operating the specific device by predetermined operations, with the first operating device being disposed at a location at which the first operating device can be operated by an occupant seated in a driver's seat of the vehicle;
    a second operating device for operating the specific device by operations corresponding to the predetermined operations, with the second operating device being disposed at a location at which an occupant seated in a seat other than the driver's seat can operate the second operating device; and a switching means for receiving a signal transmitted from one of the first operating device and the second operating device, determining whether the signal is transmitted from the first operating device or the second operating device, and switching the voice guidance generator to an operable state when it is determined that the signal is transmitted from the first operating device.

2. The voice guidance switching device of claim 1, further comprising a determination device for determining whether the second operating device has been operated from the driver's seat or a seat other than the driver's seat, with the determination device being disposed in correspondence with the second operating device, wherein the second operating device is disposed at a location at which the second operating device can be operated from the driver's seat and a seat other than the driver's seat.

3. The voice guidance switching device of claim 2, further comprising a speed detector for detecting vehicle speed and generating a speed signal corresponding to the vehicle speed, wherein the speed detector is one of directly and indirectly connected to the switching device, and the switching device switches the voice guidance generator between the operable state and the inoperable state on the basis of the speed signal.

4. The voice guidance switching device of claim 2, wherein the switching device switches the voice guidance generator between the operable state and the inoperable state on the basis of whether duration of an operation performed at one of the first operating device and the second operating device is equal to or exceeds a predetermined amount of time.

5. The voice guidance switching device of claim 4, wherein the voice guidance generator generates a voice for a function, among a plurality of functions of the specific device, selected by operation of one of the first operating device and the second operating device.

6. The voice guidance switching device of claim 4, wherein the specific device comprises:

a monitor having a screen, with the monitor outputting predetermined images on the screen; and a controller for outputting to the monitor screen one to a plurality of selections and selecting one to a plurality of the selections on the basis of a signal transmitted from one of the first operating device and the second operating device;

wherein the voice guidance generator generates a voice for the selection selected on the basis of the signal transmitted from one of the first operating device and the second operating device.

7. A system for providing voice guidance in a vehicle, the system comprising:

(a) information control apparatus mountable in the vehicle for providing information when operated, the information control apparatus including a data storage arrangement comprising a storage medium storing data and information, with the data storage arrangement being accessible by the information control apparatus for reading stored data and information;

(b) first and second controllers mountable in the vehicle operable for user input to the information control apparatus, wherein when operated, the first and second controllers transmit signals to the information control apparatus corresponding to user input to the controllers; and (c) software installed in the information control apparatus, the software when operated on the information control apparatus, causing the information control apparatus to perform processing that includes:
 (i) accepting signals transmitted from the controllers;
 (ii) determining from which controller a signal is received; and
 (iii) enabling voice guidance functions if it is determined that the received signal is from a predetermined one of the controllers, wherein the processing further includes generating voice guidance audio output for a function selected by user input via one of the controllers for performance by the information control apparatus.

8. The system of claim 7, further comprising an image sensor operable for producing image data corresponding to electromagnetic radiation received by the sensor, the image sensor being disposed in the vehicle at a location for receiving electromagnetic radiation from an area including one of the controllers, and when the image sensor is operated, provides image data to the information control apparatus, wherein the information control apparatus processing further includes determining, based on the image data received, whether a signal received from a controller is due to user input from a user seated in a position for driving or seated in a position other than for driving.

9. The system of claim 7, further comprising a speed sensor which when operated produces a speed signal corresponding to vehicle speed, and provides the speed signal directly or indirectly to the information control apparatus, and the information control apparatus processing further includes enabling or disabling voice guidance functions based on speed signal data.

10. The system of claim 7, wherein the information control apparatus processing further includes enabling or disabling voice guidance functions based on duration of a operation performed on one of the controllers.

11. The system of claim 7, wherein the information control apparatus includes a display, and the processing includes outputting display data that is shown on the display as a plurality of functions for selection by a user via either of the controllers.

12. A voice guidance switching method for application to operations of a vehicle, the method comprising the steps of:

receiving a signal from one of at least two types of devices, and determining from which device the signal is transmitted; and switching a voice guidance generator to an operable state in response to the signal when the signal is determined to be transmitted from a predetermined device of the at least two types of devices, wherein the predetermined device is a speed detector, and the step of switching the voice guidance generator to the operable state is performed on the basis of a speed signal transmitted from the speed detector, with the speed signal corresponding to vehicle speed.

13. The voice guidance switching method of claim 12, further comprising a step wherein the voice guidance generator is switched between the operable state and an inoperable state on the basis of whether duration of an operation performed at one of the at least two types of devices is equal to or exceeds a predetermined amount of time.

14. The voice guidance switching method of claim 12, further comprising a step wherein the voice guidance switching device generates a voice for a vehicular function selected by operation of one of the at least two types of devices.

15. The voice guidance switching method of claim 13, further comprising the steps of:

displaying at least one selectable function on a monitor installed in a vehicle; and selecting, by operation of one of the at least two kinds of devices, a function from the at least one selectable function displayed.

16. The voice guidance switching method of claim 12, further comprising a step wherein the voice guidance generator is switched between the operable state and an inoperable state on the basis of whether duration of an operation performed at one of the at least two types of devices is equal to or exceeds a predetermined amount of time.

17. The voice guidance switching method of claim 12, further comprising a step wherein the voice guidance switching device generates a voice for a vehicular function selected by operation of one of the at least two types of devices.

18. The voice guidance switching method of claim 12, further comprising the steps of:

displaying at least one selectable function on a monitor installed in a vehicle; and selecting, by operation of one of the at least two kinds of devices, a function from the at least one selectable function displayed.

\* \* \* \* \*